United States Patent [19]

Yamamoto

[11] Patent Number: 5,895,127
[45] Date of Patent: Apr. 20, 1999

[54] DATA TRANSMITTING DEVICE

[75] Inventor: Yasuhiro Yamamoto, Tokyo, Japan

[73] Assignee: Asahi Kogaku Kogyo Kabushiki Kaisha, Tokyo, Japan

[21] Appl. No.: 08/749,216

[22] Filed: Nov. 14, 1996

[30] Foreign Application Priority Data

Nov. 15, 1995 [JP] Japan ................................. 7-321115

[51] Int. Cl.$^6$ ................................. G03B 17/50
[52] U.S. Cl. .................. 396/30; 396/300; 396/429; 348/375; 348/552
[58] Field of Search ............................ 396/30, 429, 430, 396/529–532, 300; 348/373, 375, 376, 552, 335; 358/906, 909.1

[56] References Cited

U.S. PATENT DOCUMENTS

| | | |
|---|---|---|
| 4,841,322 | 6/1989 | Kawasaki et al. . |
| 4,945,376 | 7/1990 | Kawasaki et al. . |
| 5,278,604 | 1/1994 | Nakamura ................. 354/412 |
| 5,315,410 | 5/1994 | Takanshi et al. . |
| 5,408,341 | 4/1995 | Takanashi et al. . |
| 5,424,156 | 6/1995 | Aoki et al. . |
| 5,731,920 | 3/1998 | Katsuragawa ............... 359/827 |

FOREIGN PATENT DOCUMENTS

| | | |
|---|---|---|
| 0327236 | 8/1989 | European Pat. Off. . |
| 0622954 | 2/1994 | European Pat. Off. . |
| 5150251 | 6/1983 | Japan . |
| 2-29081 | 1/1990 | Japan . |
| 3-15087 | 1/1991 | Japan . |
| 3278342 | 12/1991 | Japan . |
| 5-24706 | 4/1993 | Japan . |
| 5165005 | 6/1993 | Japan . |
| 5-2280 | 11/1993 | Japan . |
| 6130347 | 5/1994 | Japan . |
| 6313894 | 11/1994 | Japan . |
| 7-13132 | 1/1995 | Japan . |

*Primary Examiner*—Safet Metjahic
*Assistant Examiner*—John Chizmar
*Attorney, Agent, or Firm*—Greenblum & Bernstein, P.L.C.

[57] ABSTRACT

A data transmitting device provided in an electro-developing type camera using a recording medium which electronically develops an image formed by a photographing optical system. A photographing optical system and an interface unit can be selectively attached to a lens mount of the camera body. The lens mount is provided with control data contact terminals and image data contact terminals. The control data contact terminals are used for transmitting first control data including lens information of the photographing optical system to the camera body, and for transmitting second control data between the camera body and the interface unit. The image data contact terminals are used for transmitting image data obtained by the electro-developing recording medium to the interface unit. The interface unit has an output terminal which can be connected to an external computer.

12 Claims, 8 Drawing Sheets

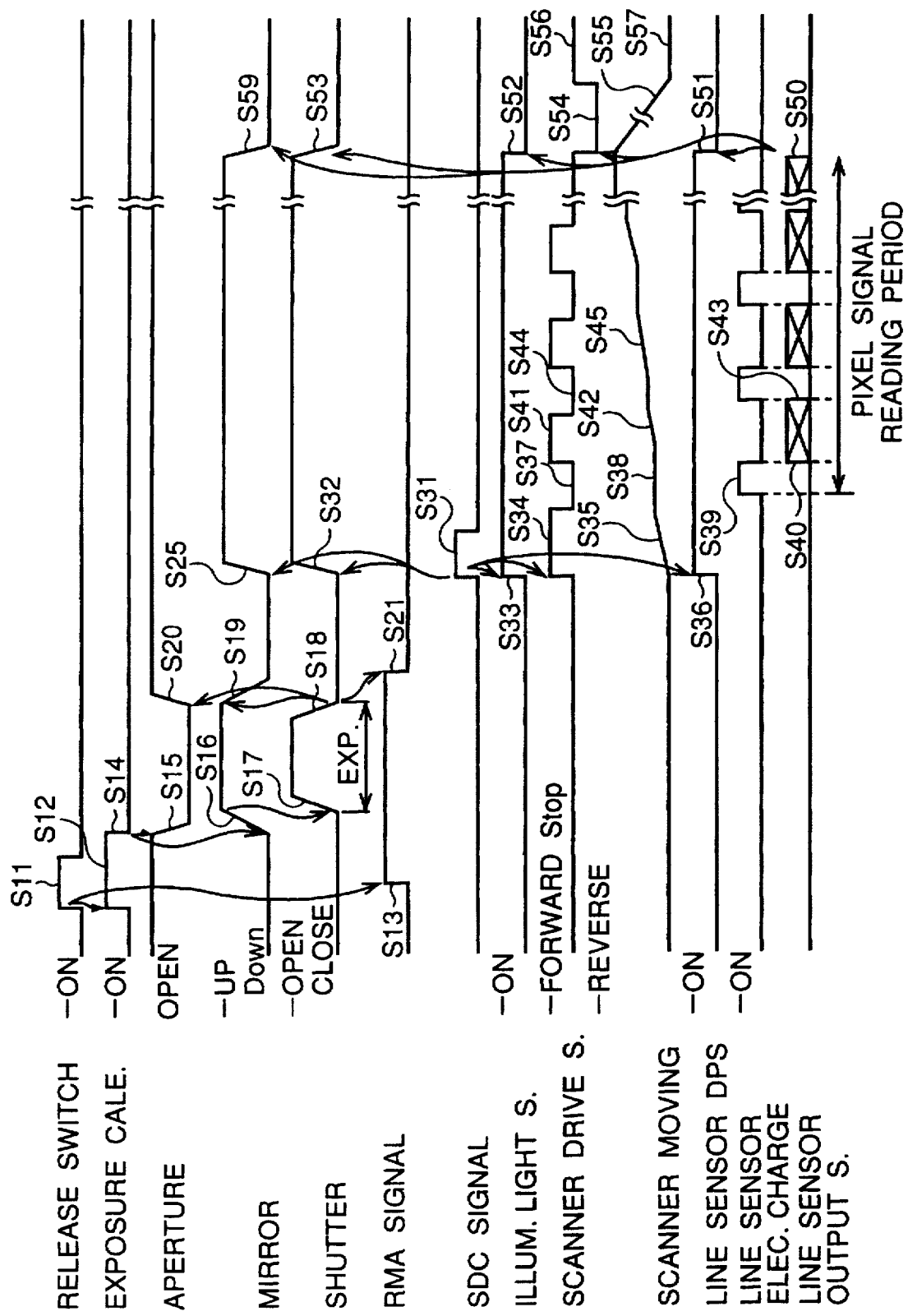

DATA TRANSMITTING DEVICE

BACKGROUND OF THE INVENTION

1. Field of the Invention

The present invention relates to a camera using a recording medium in which an object image obtained through a photographing optical system is electronically developed, and more particularly, to a device for outputting the image recorded in the recording medium to outside of the camera.

2. Description of the Related Art

Conventionally, as disclosed in Japanese Unexamined Patent Publication No. 5-2280 and U.S. Pat. No. 5,424,156, there is known a photographic material which is directly electronically developed so that a developed visible image can be immediately obtained. In this specification, such a recording medium is referred to as an electro-developing recording material, and an electronic still camera using the electro-developing recording material is referred to as an electro-developing type camera.

In the electro-developing type camera, a connecter may be provided on an outer surface of the camera body, so that image data recorded in the electro-developing recording medium are read therefrom and are transmitted through the connecter to a device, such as a computer provided outside of the electro-developing type camera. Such a connecter, however, is relatively large due to the large number of pins required, and must be handled very carefully so as not to damage the pins. This may make the handling of the camera difficult during a normal photographing operation.

SUMMARY OF THE INVENTION

Therefore, an object of the present invention is to provide a data transmitting device by which image data can be transmitted to a device provided outside of the camera without the necessity for a connecter on an outer surface of the camera body.

According to the present invention, there is provided a data transmitting device which transmits data from an electro-developing type camera to another device provided outside of the electro-developing type camera, the data transmitting device comprising a camera body of the electro-developing type camera and an image data contact terminal.

The electro-developing type camera uses an electro-developing recording medium by which an image formed by a photographing optical system is electronically developed. The camera body has a lens mount to which the photographing optical system and an interface unit can be selectively attached. The image data contact terminal is provided on the lens mount, and the image data corresponding to the image formed by the photographing optical system are transmitted from the camera body to the interface unit.

Further, according to the present invention, there is provided an image data transmitting device of a camera, comprising a camera body and an image data contact terminal.

The camera body has a lens mount to which a photographing optical system and an interface unit can be selectively attached. The image data contact terminal is provided on the lens mount, to transmit image data between the camera body and the interface unit.

Furthermore, according to the present invention, there is provided an image data transmitting device which transmits image data from a camera to another device provided outside of the camera, the image data transmitting device comprising a camera body, a photographing optical system, and an interface unit.

The camera body has a lens mount on which an image data contact terminal is provided. The photographing optical system is also detachably attached to the lens mount, to form an image on a recording medium mounted in the camera body. The interface unit is detachably attached to the lens mount, in place of the photographing optical system. Image data corresponding to the image are transmitted from the camera body to the interface unit through the image data contact terminal.

BRIEF DESCRIPTION OF THE DRAWINGS

The objects and advantages of the present invention will be better understood from the following description, with reference to the accompanying drawings in which:

FIG. 8 is a timing chart showing a recording operation and a reading operation.

DESCRIPTION OF THE PREFERRED EMBODIMENTS

Figure 1:
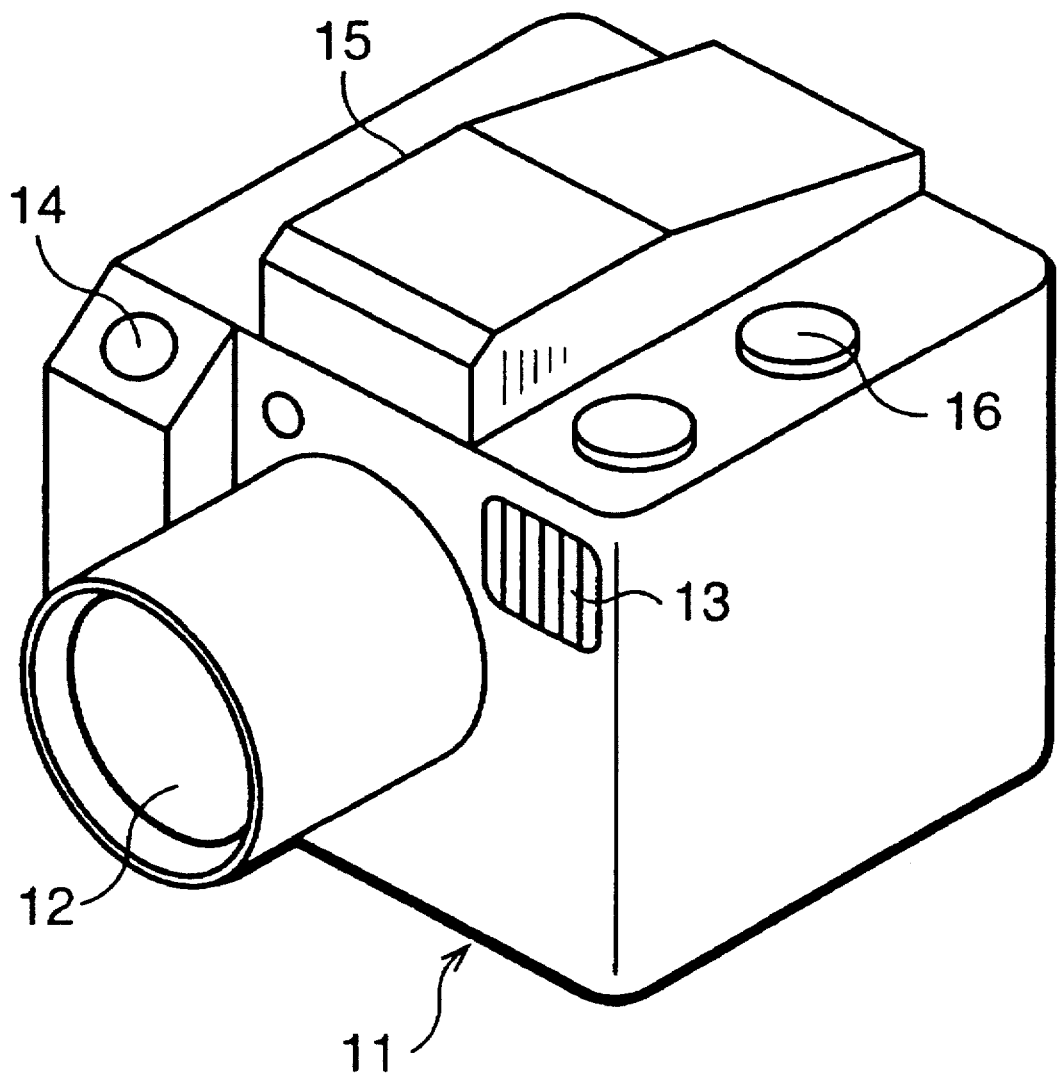
FIG. 1 is a perspective view showing an electro-developing type camera to which an embodiment according to the present invention is applied, and to which a photographing optical system is attached.

FIG. 1 is an external view of an electro-developing type camera to which an embodiment according to the present invention is applied.

When viewing a camera body 11 from a front side, a photographing optical system 12 including a photographing lens system and so on is provided approximately at a center portion of the front surface of the camera body 11, and an electronic flash 13 is disposed thereon to the right of and above the photographing optical system 12. A release switch 14 is provided on the side opposite to the electronic flash 13.

On the upper surface of the camera body 11, a view finder 15 is provided at a center portion thereof and is extended from the front end to the rear end of the camera body 11. A scanning switch 16 is provided on the upper surface and beside the view finder 15. An output terminal is formed not on a side surface of the camera body 11, but to an interface unit (not shown in FIG. 1) which can be attached to the camera body 11 instead of the photographing optical system 12 as described later, so that an image signal obtained by this camera can be outputted to an external recording device.

Figure 2:
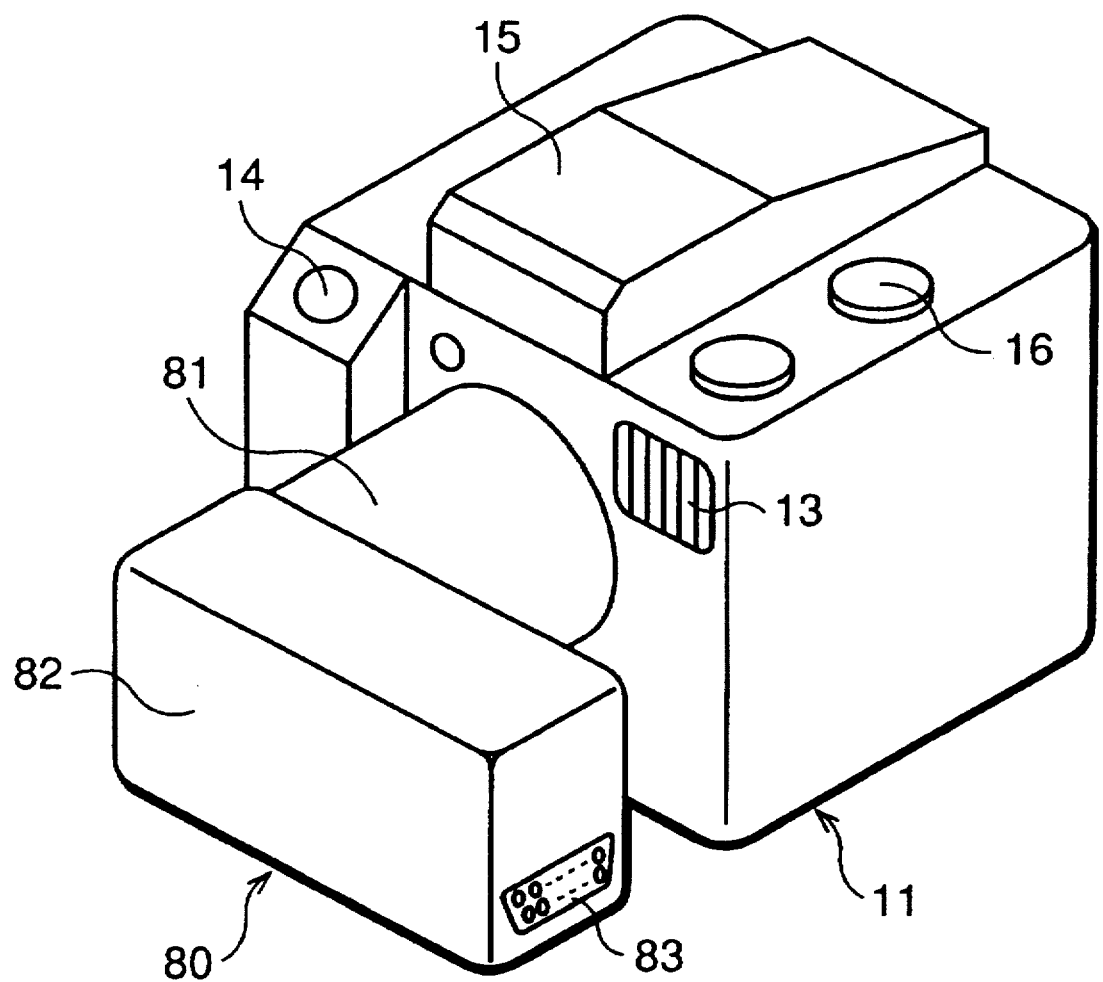
FIG. 2 is a perspective view showing the electro-developing type camera to which an interface unit is attached.

FIG. 2 shows the electro-developing type camera in a state in which the interface unit 80 is attached thereto in place of the photographing optical system 12. Namely, one of the photographing optical system 12 and the interface unit 80 can be selectively attached to the camera body 11. The interface unit 80 has a connecting unit 81 having a cylindrical shape similar to the photographing optical system 12, and a body unit 82 connected to the connecting unit 81. The body unit 82 is provided with an output terminal 83 to which a recording device and a computer, which are provided outside of the camera body 11, can be connected. Namely, image data obtained by this camera can be outputted to the external recording device (or the external computer) through the output terminal 83.

Figure 3:
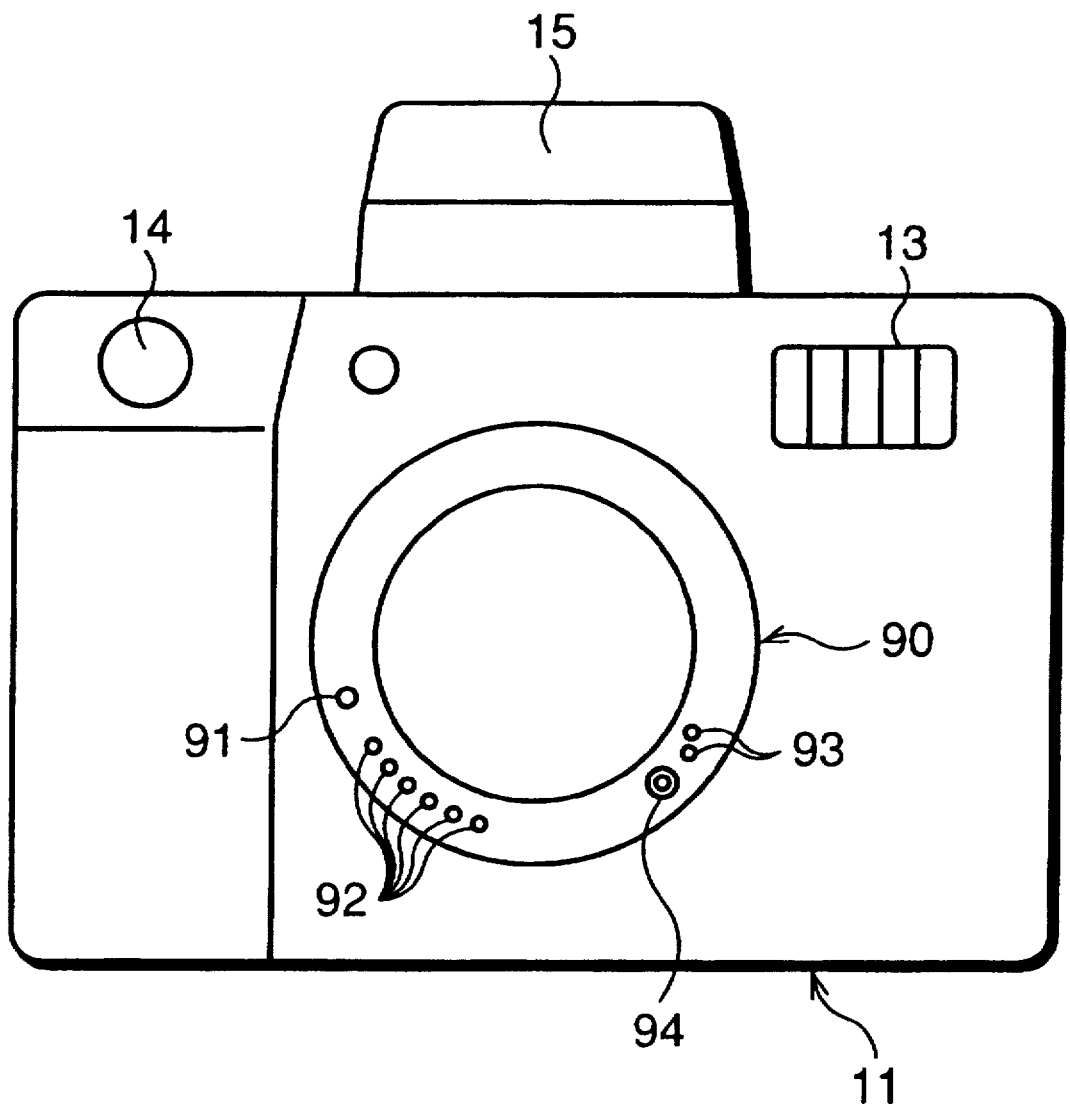
FIG. 3 is a front view showing the electro-developing type camera to which neither a photographing optical system nor an interface unit is attached.

FIG. 3 shows the camera body 11 to which neither the photographing optical system 12 nor the interface unit 80 is attached. One of the photographing optical system 12 and the interface unit 80 is attached to a lens mount 90. Lens mount 90 is annular and provided with a lock pin 91 so that the photographing optical system 12 and the interface unit 80 are positioned in a rotational direction when they are attached to the lens mount 90. The lens mount 90 is provided with control data contact terminals 92, image data contact terminals 93, and an auto focus adjustment pin 94.

The control data contact terminals 92 a re provided for transmitting first control data, including lens information, from the photographing optical system 12 to the camera body 11, and for transmitting second control data between the camera body 11 and the interface unit 80. Namely, the control data contact terminals 92 are commonly used for transmitting both the first and second control data. The image data contact terminals 93 are provided for transmitting image data obtained by an electro-developing recording medium, described later, to the interface unit 80. Contact terminals 92 and 93 have ball-shaped plungers projecting from a surface of the lens mount 90. The auto focus adjustment pin 94 is provided for moving the lens included in the photographing optical system 12 in the optical axis thereof, and a drive source of the auto focus adjustment pin 94 is housed in the camera body 11.

Figure 4:
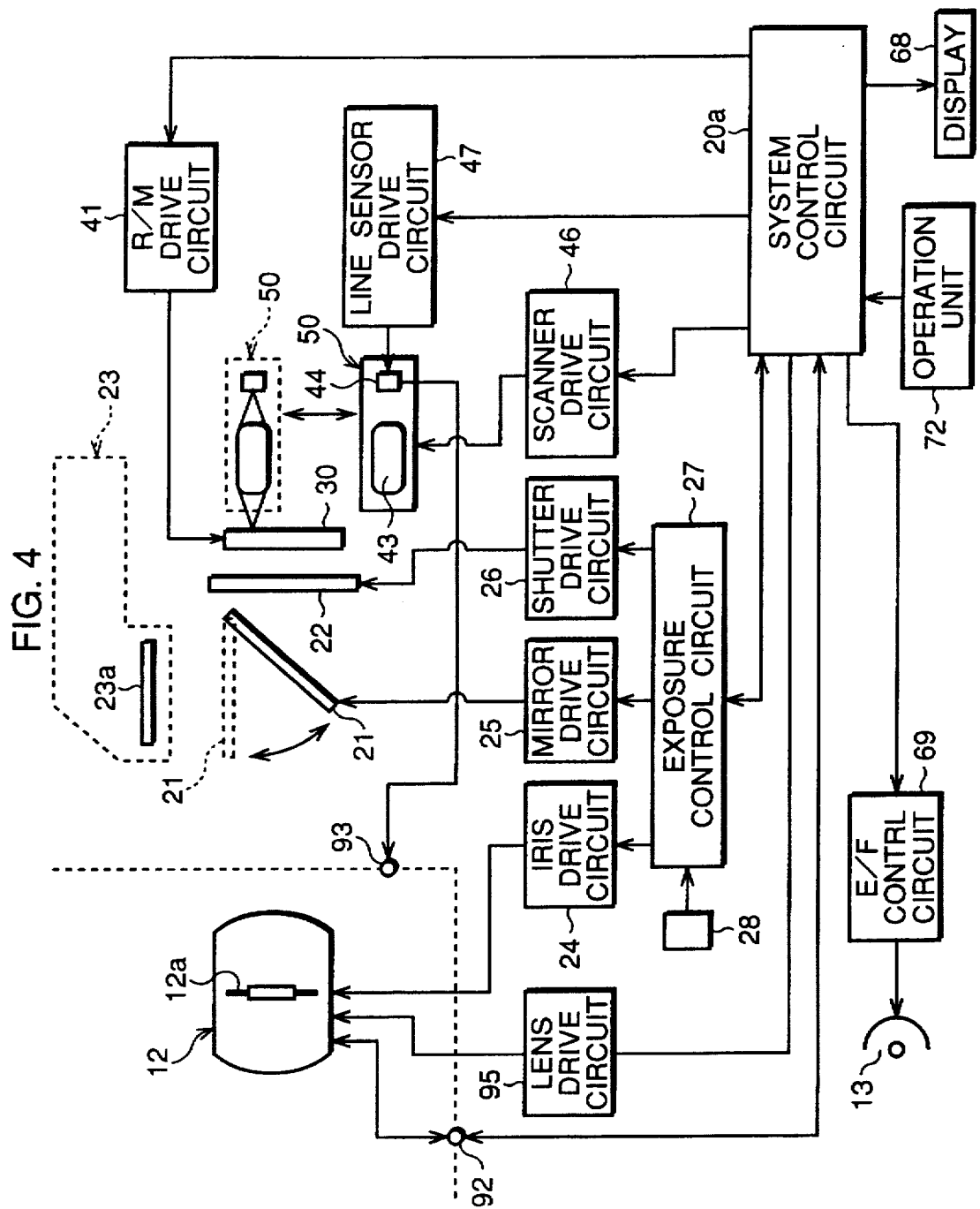
FIG. 4 is a block diagram of the electro-developing type camera in which a photographing optical system is attached to a camera body.

FIG. 4 is a block diagram of the electro-developing type camera, in which the photographing optical system 12 is attached to the camera body 11. A first system control circuit 20a is a microcomputer controlling the electro-developing type camera as a whole.

The photographing optical system 12 has a plurality of lens groups and an aperture 12a. An electro-developing recording medium 30 is disposed behind the photographing optical system 12, and a quick return mirror 21 is placed between the photographing optical system 12 and the electro-developing recording medium 30. A shutter 22 is provided between the quick return mirror 21 and the electro-developing recording medium 30. A focusing glass 23a included in a view finder optical system 23 is disposed above the quick return mirror 21.

The aperture 12a, the quick return mirror 21 and the shutter 22 are driven by an iris drive circuit 24, a mirror drive circuit 25 and a shutter drive circuit 26, respectively, which are controlled by an exposure control circuit 27.

The exposure control circuit 27 is operated in accordance with a command signal outputted by the first system control circuit 20a. Namely, when an exposure is controlled, the degree of opening of the aperture 12a is adjusted by the iris drive circuit 24 under the control of the exposure control circuit 27 based on an output signal of a photometry sensor 28.

The quick return mirror 21 is usually set to a down position (an inclining position shown by the solid line in the drawing), so that a light beam passing through the photographing optical system 12 is led to the view-finder optical system 23, and thus, an object to be photographed can be observed by the photographer. When a photographing operation is carried out, the quick return mirror 21 is rotated upward by the mirror drive circuit 25 and set to an up position (a horizontal position shown by the broken line in the drawing), so that the light beam is led to the electro-developing recording medium 30.

The shutter 22 is usually closed, but during a photographing operation, the shutter 22 is opened for a predetermined period by the shutter drive circuit 26 under the control of the exposure control circuit 27, and thus, the light beam passing through the photographing optical system 12 enters a light receiving surface of the electro-developing recording medium 30, to thereby form a two-dimensional image thereon. Note that the shutter 22 is also opened when a scanning operation of the scanning mechanism 50 is performed.

The lens groups included in the photographing optical system 12 are connected to an auto focus adjustment pin 94 (see FIG. 3) connected to an auto focus (AF) motor (not shown) provided in a lens drive circuit 95. The lens drive circuit 95 is controlled by the first system control circuit 20a, so that the auto focus adjustment pin 94 is rotated to carry out an auto focus adjustment of the photographing optical system 12.

An electric voltage (recording medium activating signal) is applied to the electro-developing recording medium 30 under the control of a recording medium drive circuit 41. By exposing the electro-developing recording medium 30 while applying this voltage, an image formed by the photographing optical system 12 is developed on the electro-developing recording medium 30 as a visible image. Note that the recording medium drive circuit 41 is operated in accordance with a command signal outputted by the first system control circuit 20a.

A scanning mechanism 50 is provided close to the electro-developing recording medium 30. A scanner optical system 43 and a line sensor 44 are supported by the scanning mechanism 50, and are moved along the electro-developing recording material 30 by a scanning operation of the scanning mechanism 50. The line sensor 44 may be a one-dimensional CCD sensor of 2000 pixels, for example. The line sensor 44 may be of suitable length to completely cover and extend over one horizontal scanning line of the image formed on the electro-developing recording medium 30. The line sensor 44 serves as a photoelectric-conversion device, which converts an optical image to an electric signal. The scanner optical system 43 and the line sensor 44 can be moved along the rear surface of the electro-developing recording medium 30. The line sensor 44 is moved in an imaging plane, on which an image is formed by the scanner optical system 43. Namely, the line sensor 44 is an optical sensor by which an image formed by the electro-developing recording medium 30 is sensed.

The control of the reading operation of pixel signals generated in the line sensor 44 is carried out by a line sensor drive circuit 47. The control of the movement of the scanning mechanism 50 is performed by a scanner drive circuit 46. The circuits 46 and 47 are controlled by the first system control circuit 20a.

An operation unit 72, in which the release switch 14 and the scanning switch 16 are provided, is connected to the first system control circuit 20a. A photographing operation (i.e. a recording operation) and a reading operation of an image signal are performed by operating the operation unit 72. A display device 68 for indicating various setting conditions of the electro-developing type camera, and an electronic flash drive circuit 69 for performing a flash control of the electronic flash 13 are also connected to the first system control circuit 20a.

In a state in which the photographing optical system 12 is attached to the lens mount 90 of the camera body 11, the first system control circuit 20a is electrically connected to a ROM (not shown) mounted in the photographing optical system 20a, through the control data contact terminals 92. Namely, a request from the first system control circuit 20a causes lens information stored in the ROM to be read into the first system control circuit 20a. Note that, at this stage, nothing is connected to the image data contact terminals 93.

Figure 5:
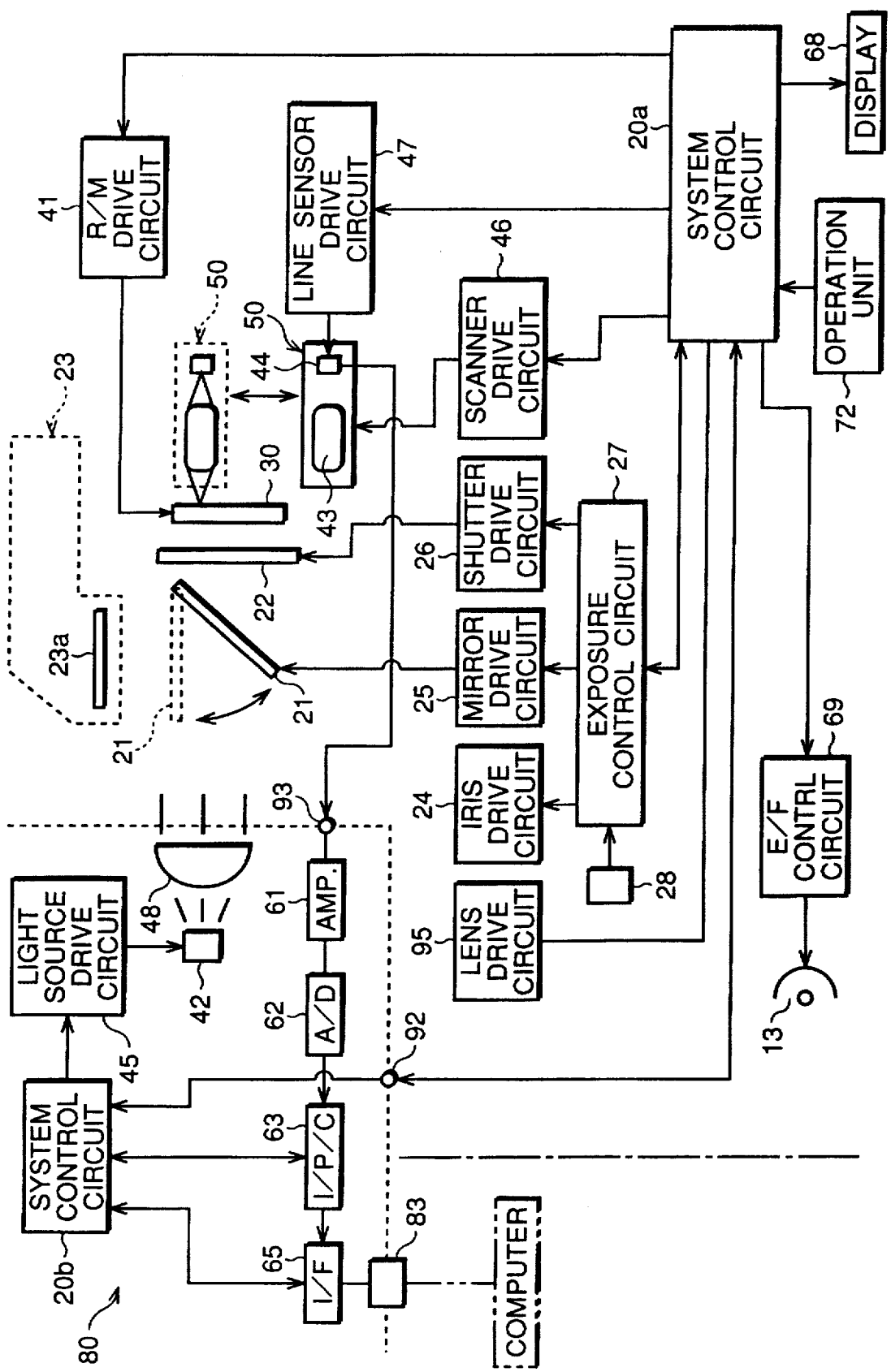
FIG. 5 is a block diagram of the electro-developing type camera in which an interface unit is attached to a camera body.

FIG. 5 is a block diagram of the electro-developing type camera in which the interface unit 80 is attached to a camera body 11. A second system control circuit 20b is a microcomputer controlling the circuits provided in the interface unit 80.

In the interface unit 80, a light source 42 including a photodiode (LED), for example, and an illumination optical system 48 are disposed at positions corresponding to the quick return mirror 21. A parallel beam is illuminated onto the electro-developing recording medium 30 through the light source 42 and the illumination optical system 48, and the scanning mechanism 50 is driven, so that an image recorded in the electro-developing recording medium 30 is read out therefrom. An ON-OFF control of the light source 42 is performed by a light source drive circuit 45, and the illumination optical system 48 is controlled by the second system control circuit 20b.

When a scanning is carried out by the scanning mechanism 50, the quick return mirror 21 is set to an up position, and the shutter 22 is opened. Further, the scanner optical system 43 is positioned between the electro-developing recording medium 30 and the line sensor 44. Therefore, the image developed by the liquid crystal display 40 of the electro-developing recording medium 30 is illuminated by the light source 42 and formed on the light receiving surface of the line sensor 44, through an operation of the scanner optical system 43. Namely, the scanner optical system 43 is disposed on the optical path of the light beam which passes through the electro-developing recording medium 30, and the line sensor 44 is moved in an imaging plane, on which an image is formed by the scanner optical system 43.

An amplifier 61, an A/D converter 62, an image processing circuit 63, and an interface circuit 65 are provided in the interface unit 80. The amplifier 61 is connected to the line sensor 44 through the image data contact terminals 93 provided on the lens mount 80 of the camera body 11. Namely, the pixel signals read out from through the line sensor 44 are amplified by the amplifier 61 and converted to a digital signal by the A/D converter 62. The digital pixel signals are subjected to a shading correction, a gamma correction and so on by an image processing circuit 63, under the control of the system control circuit 20b and then temporarily stored in a memory (not shown). The memory includes an EEPROM in which correction data for the shading correction are stored. Note that the memory may have a storage capacity equal to one horizontal scanning line outputted from the line sensor 44, or may have a storage capacity of image signals of one frame.

The pixel signals outputted from the memory are inputted to the interface circuit 65 through the image processing circuit 63, so that the pixel signals are subjected to a predetermined process, such as a format conversion, and can be outputted to an external computer (not shown) through the output terminal 83. The image process circuit 63 and the interface circuit 65 are operated in accordance with a command signal outputted from the second system control circuit 20b.

Thus, when the interface unit 80 is attached to the lens mount 90 of the camera body 11, the first and second system control circuits 20a and 20b are connected to each other through the control data contact terminals 92, and the amplifier 61 and the line sensor 44 are connected to each other through the image data contact terminals 93.

Figure 6:
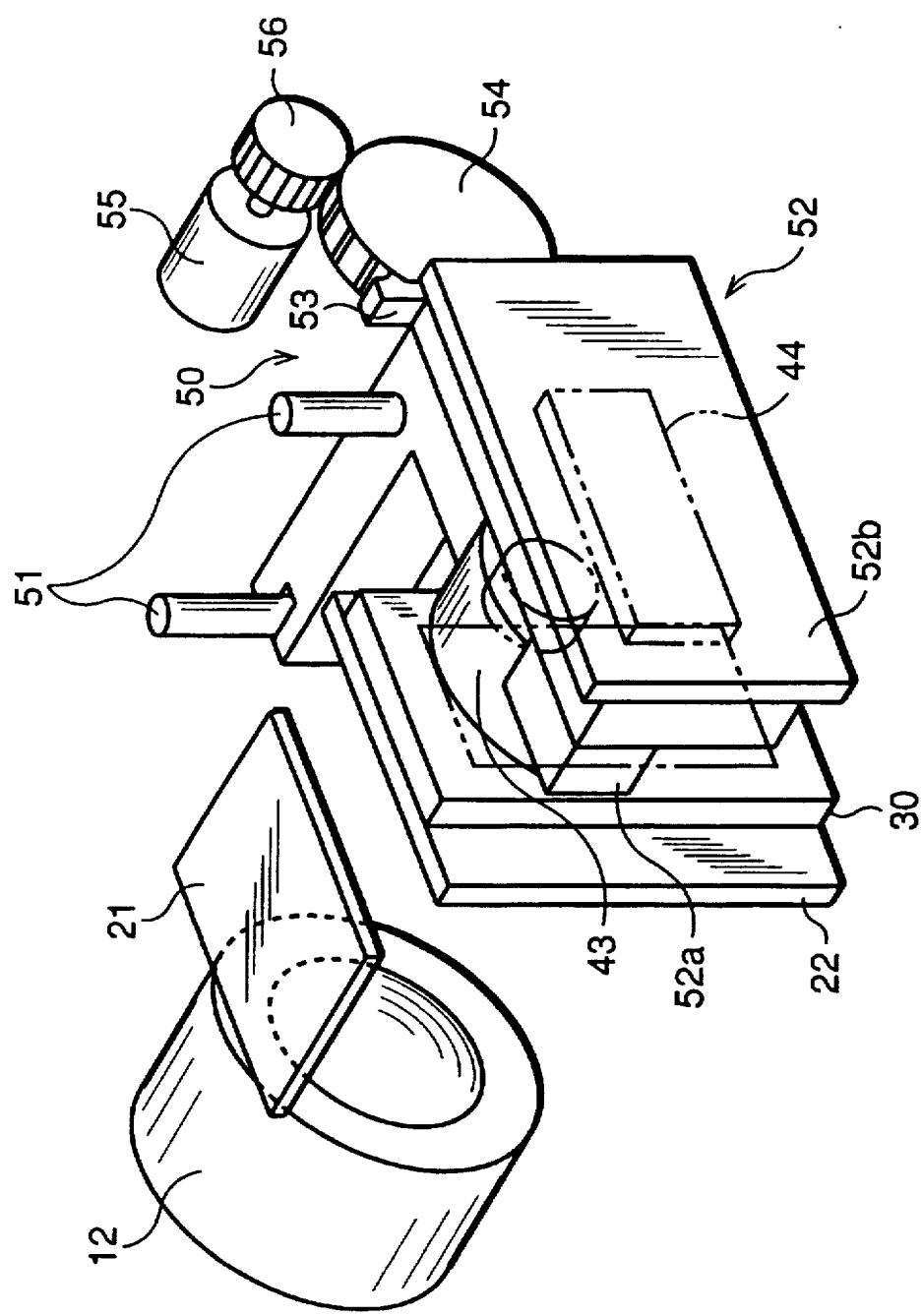
FIG. 6 is a perspective view showing a scanning mechanism.

FIG. 6 shows the structure of the scanning mechanism 50, and members provided around the mechanism 50.

The scanning mechanism 50 has a moving member 52 slidably supported by a pair of guide shafts 51 and having a leg portion 52a and a support portion 52b. The leg portion 52a is extended behind the electro-developing recording medium 30. The support portion 52b is provided behind the leg portion 52a. The scanner optical system 43 is attached to the leg portion 52a, and the line sensor 44 is attached to the support portion 52b, respectively. The line sensor 44 is extended in a horizontal direction. A rack 53 fixed to the moving member 52 is meshed with a pinion 54, which is meshed with a gear 56 provided on an output shaft of a scan drive motor 55.

Figure 7:
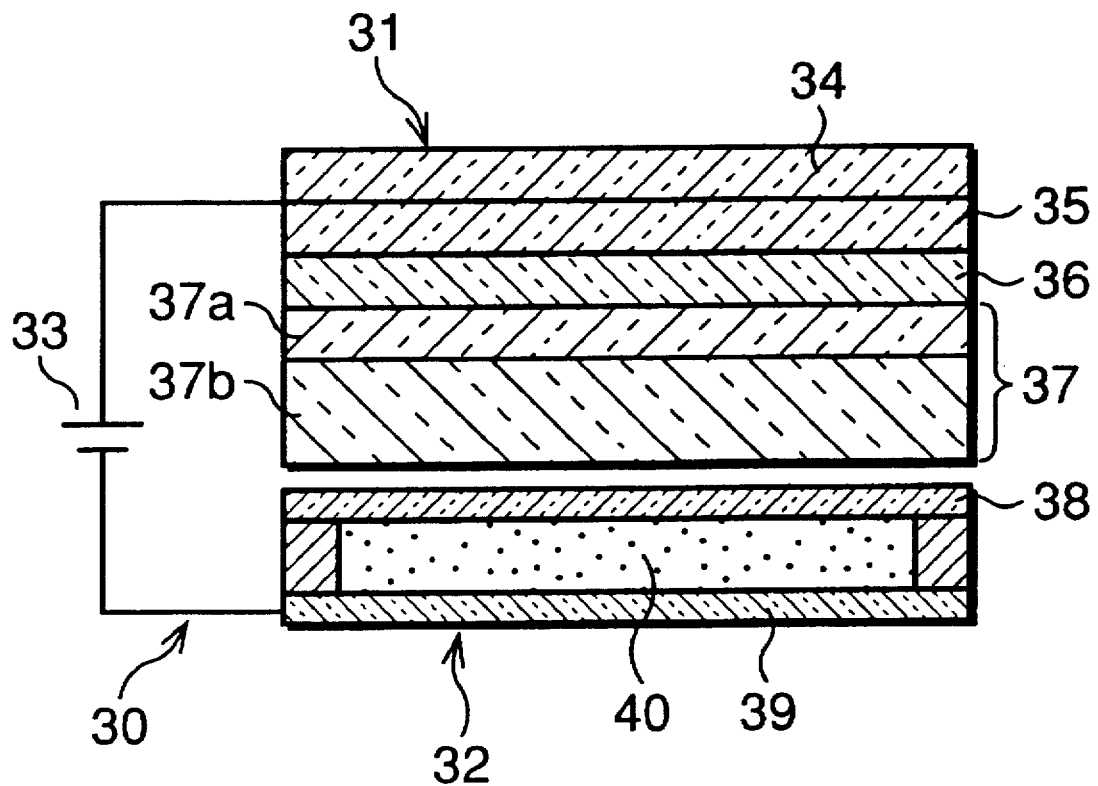
FIG. 7 is a sectional view showing a structure of an electro-developing recording medium.

FIG. 7 shows a structure of the electro-developing recording medium 30, which is basically the same as that shown in Japanese Unexamined Patent Publication No. 5-2280.

The electro-developing recording medium 30 has an electrostatic information recording medium 31 and an electric charge storage medium 32, and an electric voltage is applied thereto by an electric power source 33. The electric power source 33 corresponds to the recording medium drive circuit 41, so that an ON-OFF control of the electric power source 33 is an operation in which the recording medium drive circuit 41 applies a recording medium activating signal (a voltage signal) to the electro-developing recording medium 30.

The electrostatic information recording medium 31 is formed by laminating a base plate 34, an electrode layer 35, an inorganic oxide material layer 36, and a photoconducting layer 37. The photoconducting layer 37 is formed by laminating an electric charge generating layer 37a and an electric charge transferring layer 37b. The electric charge storage medium 32 is formed by confining a liquid crystal 40 between a liquid crystal supporting plate 38 and a liquid crystal electrode layer 39. The electric charge transferring layer 37b of the photoconducting layer 37 and the liquid crystal supporting plate 38 of the electric charge storage medium 32 face each other with a small gap therebetween.

When the electric power source 33 is turned ON, an electric voltage is applied between the electrode layer 35 and the liquid crystal electrode layer 39, i.e., between the electrostatic information recording medium 31 and the electric charge storage medium 32. When the electrostatic information recording medium 31 is exposed while the electric voltage is applied, an electric charge is generated in the electrostatic information recording medium 31 in accordance with an image formed thereon. Since the intensity of the electric field applied to the liquid crystal display 40 is changed in accordance with the electric charge, the image is indicated on the liquid crystal display 40 as a visible image, and thus, an image of an object is developed. Namely, the visible image is generated in accordance with the electric charge.

The electric charge storage medium 32 is a liquid crystal display having a memory-type liquid crystal, and thus, the developed visible image is held therein even if the electric field is removed. In this liquid crystal display, the developed visible image can be erased by heating the liquid crystal display, using a heating device (not shown) at a predetermined temperature. In this case, the same electric charge storage medium 32 can be used repeatedly.

FIG. 8 is a timing chart showing a recording operation (i.e., a photographing operation) in which an image is recorded in the electro-developing recording medium 30, and a reading operation in which the image recorded in the electro-developing recording medium 30 is read by the line sensor 44. The recording operation and the reading operation will be described with reference to this drawing. The recording operation is carried out when the photographing optical system 12 is attached to the lens mount 90, and the reading operation is carried out when the interface unit 80 is attached to the lens mount 90.

When it is sensed that the release switch 14 has been depressed (reference S11), an output signal of the photometry sensor 28, i.e., a photometry value, is sensed. An exposure calculation is started based on the photometry value (reference S12). When a predetermined time has passed since the release switch 14 was depressed, a recording medium activating signal is outputted (reference S13) and the power source 33 is turned ON, to thereby apply an electric voltage to the electrostatic information recording medium 31 and an electric charge storage medium 32. When it is confirmed that the exposure calculation has been completed (reference S14), the recording operation is performed in accordance with the result of the calculation.

The degree of opening of the aperture 12a is changed from the fully open state to a predetermined degree of opening (reference S15), and the quick return mirror 21 is changed from the down condition to the up condition (reference S16). When it is confirmed that the quick return mirror 21 has been changed to the up condition and the adjustment of degree of opening of the aperture 12a has been completed, the shutter 22 is opened (reference S17). When the exposure time obtained based on the exposure calculation has passed, and it is confirmed that the exposure has been completed, the shutter 22 is closed (reference S18). With the completion of the closing operation of the shutter 22, the mirror 21 is rotated to the down condition (reference S19) and the aperture 12a is fully open (reference S20). Further, the output of the recording medium activating signal is stopped (reference S21).

When it is confirmed that the mirror 21 and the aperture 12a have returned to the initial conditions thereof, respectively, this recording operation ends.

Then, when the interface unit 80 is attached to the lens mount 90, after removing the photographing optical system 12 from the lens mount 90, and the scanning switch 16 is depressed, the scanning operation of the scanning mechanism 50 is started and the reading operation is executed.

When the scanning switch 16 is depressed, a scanner drive signal is outputted (reference S31) from the first system control circuit 20a, and thus, the quick return mirror 21 is set to the up condition (reference S25), the shutter 22 is opened (reference S32), and the light source 42 is lit (reference S33). Then, a scanner drive signal is outputted (reference S34), so that the scan drive motor 55 is rotated in a forward direction, and thus the moving member 52 of the scanning mechanism 50 is moved upward from the lowest position of the electro-developing recording medium 30 (reference S35). Further, a line sensor drive power source included in the line sensor drive circuit 47 is turned ON (reference S36).

When it is confirmed that the line sensor 44 is set at a reading position (i.e., the first horizontal scanning line of the image to be scanned), the output of the scanner drive signal is stopped (reference S37), and thus, the scan drive motor 55 is stopped (reference S38). This stopping operation is controlled by counting pulse signals, for example, used for rotating the scan drive motor 55.

Then, an exposure of the line sensor 44 is started, so that an accumulation of an electric charge by the line sensor 44 is performed (reference S39). When it is confirmed, by sensing that a constant time has passed, that the exposure of the line sensor 44 has been completed, a reading operation of the line sensor 44 is started, and pixel signals of one horizontal scanning line are outputted from the line sensor 44 (reference S40). Then, the scanner drive signal for operating the scan drive motor 55 in a forward direction is outputted (reference S41), so that the moving member 52 is moved upward (reference S42).

During this movement of the moving member 52, when it is confirmed that the reading operation of the line sensor 44 has been completed, the reading operation is stopped (reference S43). This completion of the reading operation is controlled by counting pulse signals, for example, which are outputted from the line sensor drive circuit 47 to drive the line sensor 44. When the completion of the reading operation is not confirmed after the line sensor 44 has been set at the position of the next horizontal scanning line, i.e., the next reading position, the reading operation is stopped after the moving member 52 is stopped at the next reading position, by stopping the output of the scanner drive signal.

The number of all of the horizontal scanning lines may be 2000, for example. When all of the horizontal scanning lines have been read out (reference S50) by repeatedly carrying out the operations described above, the drive power source of the line sensor 44 is turned OFF (reference S51), and the light source 42 is turned OFF (reference S52). Then, the shutter 22 is closed (reference S53), and the quick return mirror 21 is set to the down position (reference S59). Further, a scanner drive signal for operating the scan drive motor 55 in the rearward direction is outputted (reference S54), and thus, the moving member 52 starts to descend (reference S55). Note that the completion of the reading operation for all of the horizontal scanning lines is controlled by counting the counter value counted up at every reading operation of one horizontal scanning line.

During the descent of the moving member 52, when it is confirmed that the line sensor 44 has returned to the initial position of the scanning mechanism 50, the output of the scanner drive signal is stopped (reference S56), so that the scan drive motor 55 is stopped (reference S57), and thus, the initial condition in which the recording operation can be carried out is set.

As described above, according to the embodiment of the present invention, a connector need not be provided on an outer surface of the camera body 11 so that image data recorded in the electro-developing recording medium 30 can be read therefrom and transmitted to a computer provided outside of the camera. Therefore, the user does not need to take extra care when handling the camera, so as not to break any pins provided in the connector, during a photographing operation, for example. Further, since a device such as the light source 42 and the illumination optical system 48, which is provided for illuminating the electro-developing recording medium 30, is mounted in the interface unit 80, the camera body 11 can be miniaturized and made lighter.

Note that the electro-developing recording medium 30 is not restricted to the construction described above, but can be any medium in which an image is developed electronically.

Although the embodiments of the present invention have been described herein with reference to the accompanying drawings, obviously many modifications and changes may be made by those skilled in this art without departing from the scope of the invention.

The present disclosure relates to subject matter contained in Japanese Patent Application No. 7-321115, (filed on Nov. 15, 1995) which is expressly incorporated herein, by reference, in its entirety.

I claim:

1. A device for transmitting data from an electro-developing type camera to another device provided outside of said electro-developing type camera, said electro-developing type camera using an electro-developing recording medium by which an image formed by a photographing optical system is electronically developed, said data transmitting device comprising:

a camera body of said electro-developing type camera, said camera body having a lens mount to which said photographing optical system and an interface unit can be selectively attached; and an image data contact terminal provided on said lens mount, image data corresponding to said image formed by said photographing optical system being transmitted from said camera body to said interface unit.

2. A data transmitting device according to claim 1, wherein said lens mount is provided with a first control data contact terminal through which first control data, including lens information from said photographing optical system, are transmitted from said photographing optical system to said camera body.

3. A data transmitting device according to claim 2, wherein said lens mount is provided with a second control data contact terminal through which second control data are transmitted between said camera body and said interface unit.

4. A data transmitting device according to claim 1, wherein said lens mount is provided with a control data contact terminal through which first control data, including lens information from said photographing optical system, are transmitted from said photographing optical system to said camera body, and second control data are transmitted between said camera body and said interface unit.

5. A data transmitting device according to claim 1, wherein said interface unit can be connected to a computer.

6. A data transmitting device according to claim 1, wherein said electro-developing recording medium comprises a liquid crystal display in which said image is formed, and an optical sensor that senses said image is provided in said camera body.

7. A data transmitting device according to claim 6, wherein said interface unit is provided with a light source that illuminates said liquid crystal display.

8. A data transmitting device according to claim 6, wherein said interface unit is provided with an image processing circuit that applies a predetermined process to said image sensed by said optical sensor.

9. A data transmitting device according to claim 1, wherein said electro-developing recording medium comprises an electrostatic information recording medium that generates an electric charge in accordance with an image formed thereon, and an electric charge storage medium which generates a visible image in accordance with said electric charge and which can hold said visible image.

10. A data transmitting device according to claim 9, wherein said electric charge storage medium comprises a liquid crystal display having a memory-type liquid crystal.

11. A data transmitting device of a camera, comprising:

a camera body having a lens mount to which a photographing optical system and an interface unit can be selectively attached; and an image data contact terminal provided on said lens mount, to transmit image data between said camera body and said interface unit.

12. A device for transmitting image data from a camera to another device provided outside of said camera, said image data transmitting device comprising:

a camera body having a lens mount on which an image data contact terminal is provided;

a photographing optical system detachably attached to said lens mount to form an image on a recording medium mounted in said camera body; and an interface unit detachably attached to said lens mount, in place of said photographing optical system, wherrein image data corresponding to said image is transmitted from said camera body to said interface unit through said image data contact terminal.

* * * * *